No. 772,070. Patented October 11, 1904.

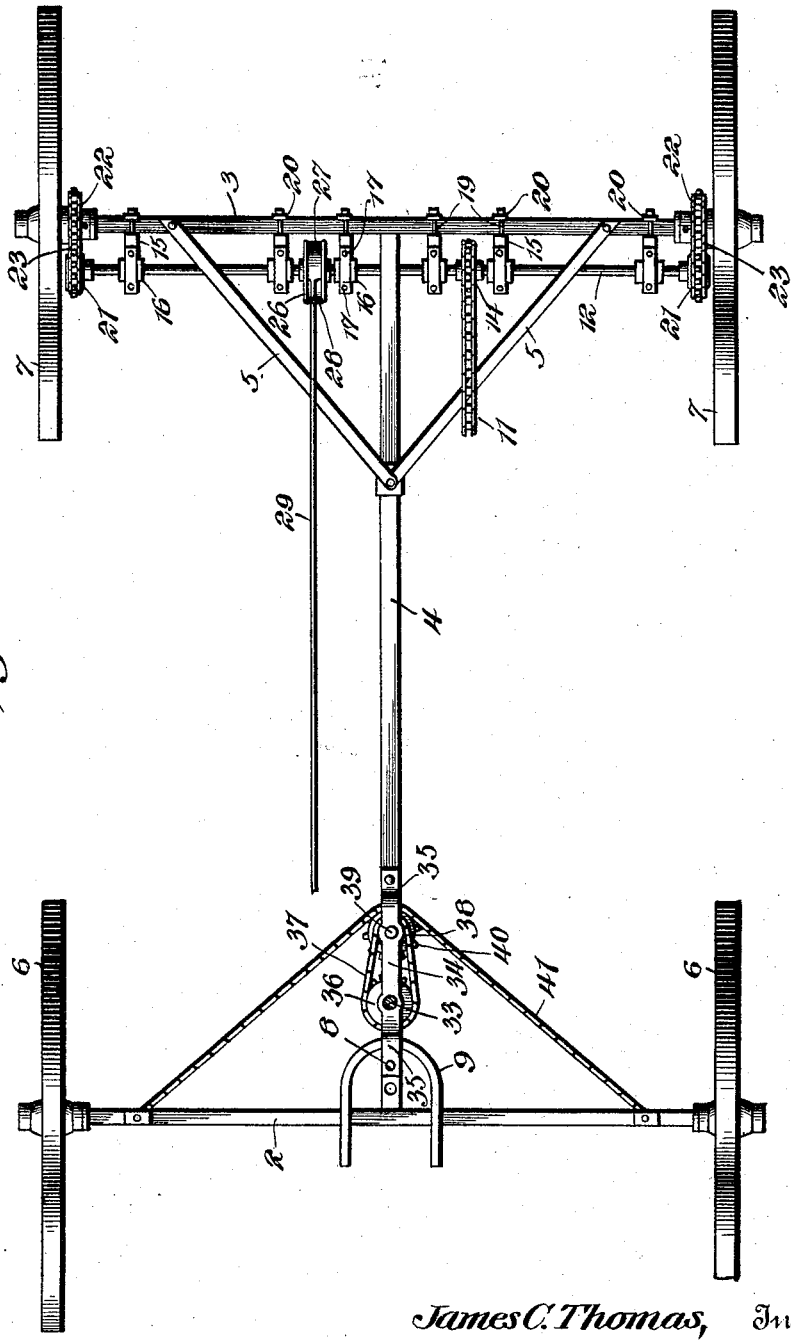

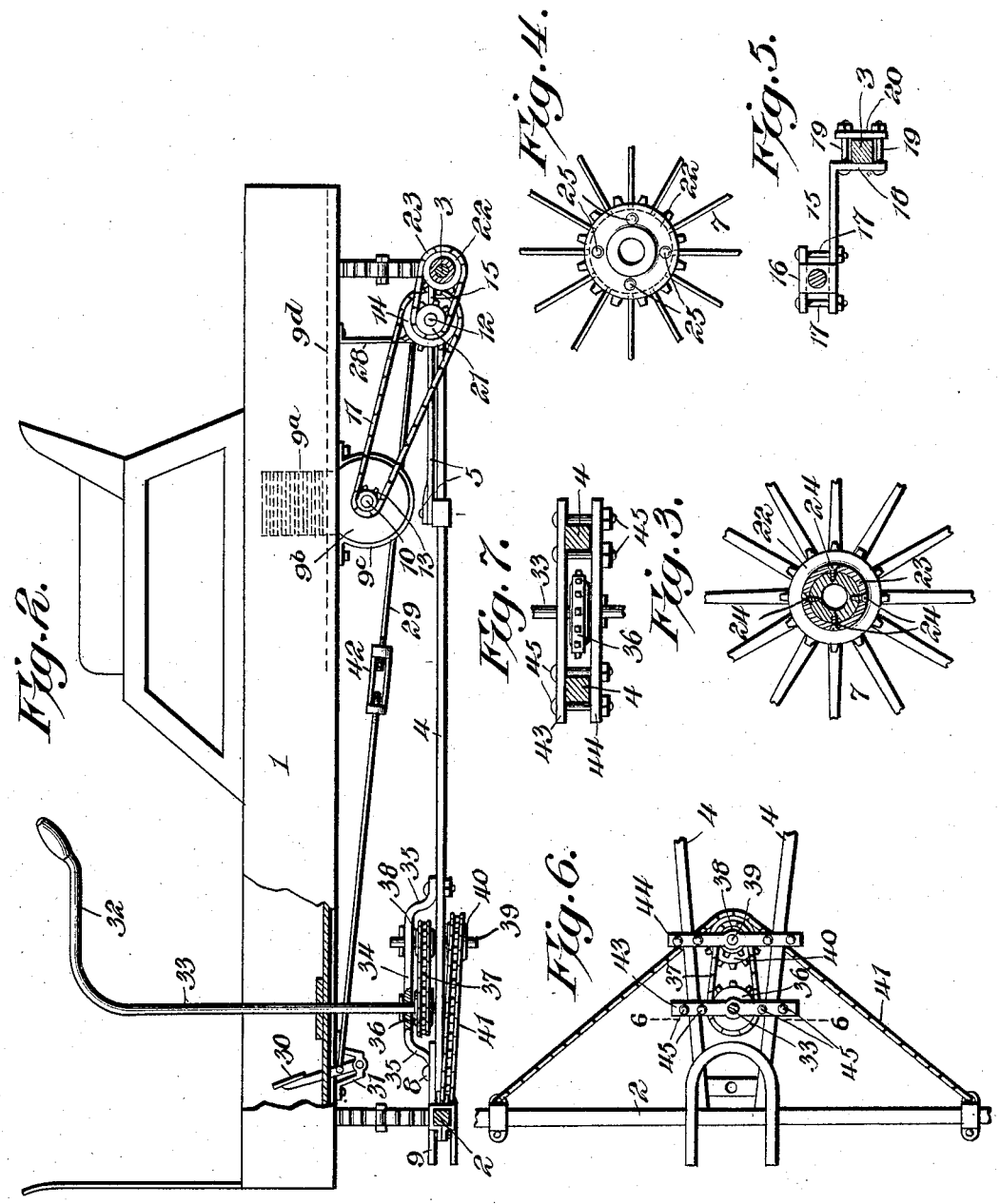

UNITED STATES PATENT OFFICE.

JAMES CLARENCE THOMAS, OF CORSICANA, TEXAS.

MOTOR-VEHICLE.

SPECIFICATION forming part of Letters Patent No. 772,070, dated October 11, 1904.

Application filed October 22, 1903. Serial No. 178,129. (No model.)

*To all whom it may concern:*

Be it known that I, JAMES CLARENCE THOMAS, a citizen of the United States, residing at Corsicana, in the county of Navarro and State of Texas, have invented a new and useful Motor-Vehicle, of which the following is a specification.

This invention relates generally to vehicles, but more particularly to a novel equipment therefor, including propelling, steering, and brake mechanism, which while embracing features which are desirable for general automobile constructions are nevertheless particularly designed as an attachment for various classes of ordinary road-vehicles, the object of the invention considered in a broad aspect being to provide means whereby vehicles now in use may be quickly and inexpensively converted into self-propelled vehicles of the automobile type. Subordinate to this general object are various others, which will appear more fully during the succeeding description of the illustrated embodiment of the invention.

In the accompanying drawings, Figure 1 is a plan view of the running-gear of a vehicle equipped in accordance with my invention. Fig. 2 is a side elevation of a vehicle similarly equipped with a portion of the vehicle-body broken away and the wheels omitted. Fig. 3 is a detail sectional elevation showing the manner in which the driving-sprockets are secured to the hubs of the wooden wheels. Fig. 4 is an elevation illustrating the manner of attaching the driving-sprockets to metal or wire-spoked wheels. Fig. 5 is a detail sectional view illustrating the manner in which the driving-shaft is supported from the rear axle. Fig. 6 is a plan view illustrating the manner of attaching the steering mechanism to a double-reach vehicle, and Fig. 7 is a detail sectional view on the line 6 6 of Fig. 6.

Like numerals are employed to designate corresponding parts in the several views.

1 indicates the body, 2 and 3 the front and rear axles, 4 the reach, 5 the hounds, and 6 and 7 the front and rear wheels, of an ordinary road-vehicle. The front axle 2 has pivotal connection with the reach in the usual manner, as indicated at 8, and is provided with an ordinary fifth-wheel 9.

Within the body of the vehicle is mounted a suitable motor $9^a$, which may be supported in any suitable manner; but by preference its gear-case $9^b$ is supported below the vehicle-body by means of one or more angle-iron hangers $9^c$, bolted to one or more sills $9^d$, carried by the frame of the vehicle-body. The motor-shaft 10 (indicated diagrammatically in Fig. 2) is geared, by means of a sprocket-chain 11, to a driving-shaft 12, said chain passing around sprockets 13 and 14, mounted on the motor and driving-shaft, respectively, and relatively proportioned to secure the desired speed. The driving-shaft 12 is disposed parallel with the rear axle 3 (see Fig. 1) and is carried by the latter through the medium of a series of bearing-brackets 15, extending forwardly from the rear axle 3 and carrying journal-boxes 16, secured to the brackets by bolts 17, as best shown in Fig. 5. The brackets 15 are designed to be quickly attached to the axle irrespective of the size of the latter, and while various means for effecting this detachable connection may be provided I prefer to provide each bearing-bracket with an angular rear end 18, opposed to one side of the axle and secured in place by clamping-bolts 19, disposed above and below the axle and connecting the angular end 18 with a clamp-plate 20, imposed against the rear face of the axle and extended above and below the same. The opposite ends of the driving-shaft 12 are equipped with sprockets 21, geared to driving-sprockets 22 by means of chains 23, the driving-sprockets being rigidly connected to the rear wheels of the vehicle in any approved manner.

In Figs. 3 and 4 I have illustrated the preferred modes of attaching the driving-sprockets to ordinary wooden wheels and to wire-spoked wheels of the type ordinarily employed in automobile constructions. In the former figure the driving-sprocket 22 is provided with a cylindrical hub or sleeve 23, encircling the hub of the wheel and rigidly secured thereto by any suitable means—as, for instance, screws 24. In Fig. 4 a plate-sprocket is fitted upon the metallic hub and is secured to the wire spokes or hub-flange by fastening devices 25 of approved form.

It will now be seen that the propelling mechanism includes a driving-shaft detachably carried by the rear axle of the vehicle and geared to the motor and to the vehicle-wheels, respectively, by chain-and-sprocket gearing, which is sufficiently flexible to prevent ordinary vibration of the vehicle from effecting the derangement of the operative connection. An adjunct of this detachable driving mechanism is a novel brake mechanism including a brake-drum 26, fixed to the shaft 12 and encircled by a brake-band 27, having one end 28 attached to a fixed part—as, for instance, the body of the vehicle, as shown in Fig. 2—and having its opposite end connected to a brake-rod 29, passed through a slot in the band. The band 27 may be and preferably is integral with the rod 29. The brake-rod 29 extends forwardly under the body of the vehicle to a point adjacent to the front end thereof, where it is connected to a foot-operated brake-lever 30, fulcrumed in a bracket 31 at the under side of the vehicle-body. The brake-lever extends through the floor of the vehicle adjacent to the dashboard and may be swung by the operator to draw the brake-band into frictional contact with the drum 26 in order to retard the progress of the vehicle when desired.

Another feature of the equipment resides in the provision of the steering mechanism, which like the propelling and brake mechanisms, may be quickly applied to an ordinary vehicle without considerable expense or the necessity for the employment of skilled labor. The steering mechanism includes a steering-lever 32, located within convenient reach of the operator and extending from the upper end of a steering-shaft 33, disposed vertically and afforded bearings at its lower end in the reach 4 and in a bearing-bracket 34, bolted to the upper side of the reach. The bracket 34 is preferably in the form of a metal bar, disposed parallel with the reach and spaced therefrom by bolt-flanges 35, bolted to the reach and formed by bending down the opposite ends of the plate. Upon the lower end of the shaft 33 is keyed a sprocket 36, located between the reach and the bracket 34 and around which is passed a sprocket-chain 37, which is also passed around a sprocket 38, mounted on a counter-shaft 39, afforded bearings in both the reach and bracket and extended below the former. At the lower end of the counter-shaft 39 is keyed a sprocket 40 around the rear side of which is passed the middle portion of a sprocket-chain 41, secured at its opposite ends to the front axle 2, preferably at points adjacent to the wheel. The sprockets 36, 38, and 40 may bear any proportional relation to each other to secure the desired leverage between the steering-lever 32 and the axle of the vehicle. Obviously metal rods might be substituted for the end portions of the chain 41, if preferred, and in order to adjust the length of the brake-rod in accordance with the length of the vehicle to which it is designed to be applied said rod may be of sectional form, as shown, and provided with a turnbuckle 42.

In Figs. 6 and 7 I have shown a variation of the mounting for the steering mechanism, which is designed with special reference to the equipment of a vehicle having a double reach. This variation contemplates in lieu of the bracket 34 two pairs of transversely-disposed bearing-plates 43 and 44, the plates of each pair being disposed above and below the bars of the reach and clamped to the latter by bolts 45. In this event the shafts 33 and 39 will each be afforded bearings in a pair of plates, and the sprockets 36 and 38 will be mounted on said shafts between the upper and lower plates, as shown.

It is thought that from the foregoing the construction of the vehicle equipment and the manner of attaching the same to a vehicle of ordinary construction will be readily comprehended; but while the illustrated embodiment of the invention is thought at this time to be preferable I desire to reserve the right to effect such changes, modifications, and variations of the described structure as may come fairly within the scope of the protection prayed.

What I claim is—

1. In a vehicle, the combination with a vehicle running-gear including a reach, and an axle pivotally connected thereto, of a steering-shaft provided with a steering-lever, a counter-shaft geared to the steering-shaft, a sprocket mounted on the counter-shaft, and a sprocket-chain engaging one side of the sprocket-wheel and having its opposite ends connected to the axle.

2. In a vehicle, the combination with a vehicle running-gear including a reach and an axle pivotally connected thereto, of a bearing-bracket mounted on the reach, a steering-shaft and a counter-shaft, both afforded bearings in said bracket, chain-and-sprocket gearing connecting said shafts, and chain-and-sprocket gearing connecting the counter-shaft to the axle.

3. In a vehicle, the combination with a vehicle running-gear including a reach, and an axle pivotally connected therewith; of a bearing-bracket mounted on the reach, a steering-shaft and a counter-shaft, both afforded bearings in both the reach and bearing-bracket, chain-and-sprocket gearing connecting the two shafts and located between the bearing-bracket and the reach, a sprocket-wheel mounted on the counter-shaft below the reach, and a chain engaging the rear side of said sprocket and having its opposite ends connected to the opposite ends of the axle.

In testimony that I claim the foregoing as my own I have hereto affixed my signature in the presence of two witnesses.

JAMES CLARENCE THOMAS.

Witnesses:
 HAROLD TALLEY,
 FRED FLEMING.